(12) United States Patent
Lundberg et al.

(10) Patent No.: US 8,560,424 B2
(45) Date of Patent: Oct. 15, 2013

(54) METHOD AND A SYSTEM FOR IMPROVED TRADING OF COMBINATIONS AND BAITS GENERATED THEREOF

(75) Inventors: Jonas Lundberg, Stockholm (SE); Ulf Ahlenius, Bromma (SE)

(73) Assignee: OMX Technology AB, Stockholm (SE)

( * ) Notice: Subject to any disclaimer, the term of this patent is extended or adjusted under 35 U.S.C. 154(b) by 2072 days.

(21) Appl. No.: 10/171,510

(22) Filed: Jun. 14, 2002

(65) Prior Publication Data
US 2003/0233308 A1    Dec. 18, 2003

(51) Int. Cl.
*G06Q 40/00* (2012.01)

(52) U.S. Cl.
USPC .............................................. 705/37; 705/35

(58) Field of Classification Search
None
See application file for complete search history.

(56) References Cited

U.S. PATENT DOCUMENTS

| | | | | |
|---|---|---|---|---|
| 5,191,652 | A | * | 3/1993 | Dias et al. ...................... 709/251 |
| 5,689,652 | A | | 11/1997 | Lupien et al. |
| 6,049,772 | A | * | 4/2000 | Payne et al. ......................... 705/4 |
| 6,098,051 | A | * | 8/2000 | Lupien et al. ................ 705/36 R |
| 6,418,419 | B1 | * | 7/2002 | Nieboer et al. .................. 705/37 |
| 7,082,410 | B1 | * | 7/2006 | Anaya et al. ..................... 705/37 |
| 7,162,447 | B1 | * | 1/2007 | Cushing ........................... 705/37 |
| 2002/0067355 | A1 | | 6/2002 | Randel |
| 2002/0103852 | A1 | * | 8/2002 | Pushka ......................... 709/203 |
| 2002/0107781 | A1 | * | 8/2002 | Neyman et al. .................. 705/37 |
| 2002/0161686 | A1 | * | 10/2002 | Stover et al. ...................... 705/36 |
| 2002/0178102 | A1 | * | 11/2002 | Scheinberg et al. ............. 705/37 |

FOREIGN PATENT DOCUMENTS

| | | |
|---|---|---|
| EP | 1 241 602 A1 | 9/2002 |
| GB | 2 277 177 A | 10/1994 |
| WO | WO 00/11587 | 3/2000 |

OTHER PUBLICATIONS

Declaration of Non-Establishment of International Search report dated Oct. 23, 2003.
International Preliminary Examination report dated Jan. 7, 2004.

* cited by examiner

*Primary Examiner* — Rajesh Khattar
(74) *Attorney, Agent, or Firm* — Nixon & Vanderhye P.C.

(57) ABSTRACT

In automated exchange system, a single matching unit is supplemented with a calculation unit and a global memory accessible by both the calculation unit and the matching unit. Such a computer architecture will make it possible to perform some of the calculations related to the volume and/or prices of the baits needed in the matching to be performed in advance. The matching process is able to use the values resulting from the pre-calculation when needed, and since no or few calculations are done in one of the most critical parts of the system, i.e. the matching unit, the process of matching combination contracts can be performed at a much higher rate. Hereby the performance of the matching process will be significantly increased. The provision of one or several calculation units will make it possible to perform even very complex calculations can be performed since most calculations need not be performed in real time.

12 Claims, 3 Drawing Sheets

US 8,560,424 B2

METHOD AND A SYSTEM FOR IMPROVED TRADING OF COMBINATIONS AND BAITS GENERATED THEREOF

TECHNICAL FIELD

The present invention relates to an automated exchange system, and in particular to an automated exchange designed to execute matching of combinations of financial instruments.

BACKGROUND

In many electronic exchange systems today it is possible to trade so called combination orders. A combination order is an order implying the simultaneous trade of two or more contracts. The combination contract for which the orders are given can be set up as a separate instrument and be traded as such or the order is entered as a combination order into two or more instruments without a specific name for the combination order. In derivative exchanges, combination orders are usually called different names such as straddle, strangle, bull or bear spread etc. However, in a system trading cash instruments, e.g. bonds, stocks etc., combination orders usually do not have any special names as in the derivative exchanges. The reason why combination orders exist is that a strategy can be entered via the combination order, and the electronic exchange guarantees that all parts of a complex transaction is executed if a deal is closed. The different parts (sub-contracts) of a combination are sometimes termed legs and this term will be used hereinafter. As an example, assume that a combination order is entered in two instruments where as a first part of the order, contract A, is to be sold and as a second part of the order, contract B, is to be bought. The system will then guarantee that the legs A and B, i.e. the selling of contract A and buying of contract B, will be executed at the same time.

Combination contracts are today set up with natural numbers as ratios. Thus if size one of A is sold then one, two, three, . . . is bought of B. The most common ratio between legs in a combination contract is a one-to-one ratio, where if one contract of A is sold, one contract of B is bought.

If the ratio is one to one, the price of the combination order is the price of contract A minus price of contract B. Thus, if the contract B costs more than the contract A the price of the combination will be positive since the order in the combination will result in a cash outflow.

Furthermore, the input of a combination order in an automated exchange system usually generates so called baits or derived orders. Baits are orders in the outright market of the legs comprised in the standard combination set at prices such that the combination order as a whole will match the prices of the legs in the outright market. This bait generation is made in order to increase the liquidity in the outright instruments as well as for the combination contract.

The derived orders are in a conventional automated system generated by the matching process as a result from a combination order. As simple example, assume that the combination order is to buy one contract A and sell one contract B. Assume further that there is an existing order in the outright market to sell one contract A at a particular price. However, there is no order to buy one contract B at a price that would match the price of the combination order. In this case an order to sell one contract B could be generated in the outright market. Thus, to continue the example, assume a trader who wants to buy the combination Buy_A_Sell_B for a price of 2 at volume 50. The combination order implies that the trader is willing to pay 2 more for each contract bought of A than sold of B. Assume further that there exists a sell order in the market for A at price 100 and volume 25. In this case the submission of the combination order can result in the generation of a bait (derived order) to sell 25 B at the price of 98. If someone enters into the trade against the bait, a simultaneous trade will occur in A at the price 100 for the volume up to 25. The reason why the bait is generated at the volume of 25 is that this is the only volume that can be guaranteed to be executed. Thus, no additional volume should be generated as a bait even though the order in the combination has a volume of 50.

The ratios between the buy and sell orders in a combination contract are in a conventional exchange always natural numbers and that is a big limitation. The reason for this is described below. A natural number limitation is usually not a major problem when strategies of options or equities are to be traded. However, if trades in bonds or similar financial contracts, between different products, hedge options with futures or the underling stock, index and similar types of contracts, the ratios must be calculated by some formula in order to provide maximum benefit.

For example, if an option is to be hedged with it's underlying financial instrument. Then the volume of the underlying instrument should be hedged by the delta value of the option in order to minimize the risk involved, or worded differently optimize the effect of hedging operation. In the case when a bond is traded against another bond the hedge ratio may be calculated to be duration neutral. The duration of the bond is often considered to be the risk of the bond. In these cases the ratio between the legs in the combination contact traded will not be a natural number.

As a further example, assume a switch of bond C to bond D by selling bond C and buying bond D. The volume of bond C is given by the sell order to be 10. The volume of bond D is then calculated to be (volume order)*(duration of bond C)/(duration of bond D). This volume is almost by certainty a non-natural number. At first glance this transaction can seem to be straight forward, but since the price of the bond is determined by the duration of the bond, the duration has to be calculated dynamically depending on the price in the outright market of the bond. To calculate the duration of both bonds in the combination the price of one of the bonds has to be known and also the price of the combination before the volume of both bonds can be calculated. The price of the combination may be set in a price difference, the price of the combination is fixed even though the price of the legs change, as in the normal standard combination explained above. It may also be priced as a yield difference between the two or by some other standard.

Regardless of the pricing mechanism used, the ratio of the volumes cannot be set as natural numbers. The same holds for the trading of covered options as described above where the delta value is dependent on the price of the option as well as the price of the underlying instrument.

Thus, there are many combination orders where the ratios between the legs in the combination are not natural numbers. These include covered options, future basis trades, switches of bonds, etc., where the weight and/or the price is derived by some formulae.

In an automated exchange system a major bottleneck is the matching unit, where all matching takes place. The calculations of ratios different from natural numbers result in a very high load on the computer processor used. Therefore, no existing system makes such calculations.

A conventional way of increasing the processing power in a matching unit is to partition the execution into two or several partitions each operating on a different set of data. For example one partition may operate on data for a first type of financial instruments whereas another partition operates on data for a second type of financial instruments.

However, such a solution will not work satisfactorily if the matching unit is to match combination orders and generate derived orders because different legs of the order may be processed in different partitions. This is because the matching process calculates the prices as well as the volumes of the derived orders. Hence, it is not possible to have combinations of instruments belonging to two different partitions, because a simultaneous execution of all legs cannot be guaranteed. It is therefore not practical in existing automated exchanges to add any advanced calculations for bait generation, since that will make the matching process very slow.

SUMMARY

It is an object of the present invention to provide a method and a system wherein the trading of combination is able to use formulas to derive the volume and/or the price and thereby reduce the execution risk for the party entering into such a transaction.

It is a further object of the present invention to provide a method and a system where y combination orders involving non-natural numbers can be executed without significantly increasing the load on the computer processor used in the matching.

It is yet another object of the present invention to provide a computer architecture designed to cope with the real-time constraints of order matching in an automated exchange and which at the same time can provide data requiring complex calculations, in particular, complex calculations related to matching of combination orders, and derived orders generated as a result of such combination orders.

These objects and others are obtained in a system and a method as set out in the appended claims.

It is crucial for an electronic system to have an efficient and fast matching process since that is usually one of the bottlenecks of an electronic trading system.

Thus, matching unit is supplemented with a calculation unit and a global memory accessible by both the calculation unit and the matching unit. Such a computer architecture makes it possible to perform some of the calculations related to the volume and/or prices of the baits needed in the matching in advance, and store the calculated values in a global memory. The matching process can then use the values resulting from the pre-calculation when needed, and since no or few calculations are done in one of the most critical parts of the system, i.e., the matching unit, the process of matching combination contracts can be performed at a much higher rate. As a result, the performance of the matching process is significantly increased. The provision of one or several calculation units makes it possible to perform even very complex calculations because since most complex calculations need not be performed in real time.

BRIEF DESCRIPTION OF THE DRAWINGS

The present invention will now be described in more detail by way of non-limiting examples and with reference to the accompanying drawings, in which.

DETAILED DESCRIPTION

Figure 1:
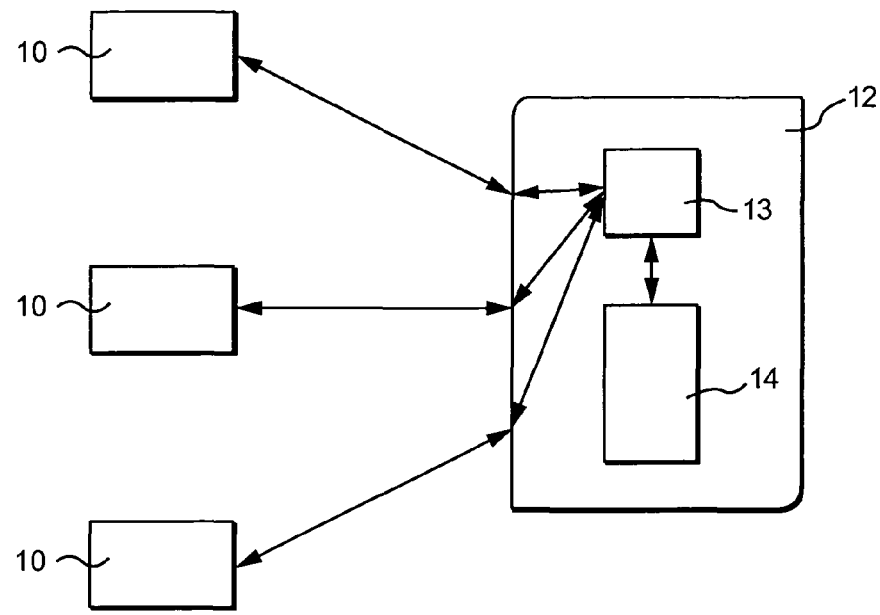
FIG. 1 is a general view of an automated exchange system

In FIG. 1, a general view of an automated exchange system is shown. The system comprises a number of remote terminals 10 all connected to a central computer server 12 comprising a matching unit 13 including a computer processor, and an order book (memory) 14 associated therewith. The central computer server 12 is loaded with suitable software, such as the CLICK ™ software sold by OMX Technology AB, Sweden, and forms an automated exchange. The remote terminals 10 are designed to send data to and receive data from the central computer server 12. The terminals 10 are further designed to provide an interface for investors, such as broker firms etc., trading contracts including combination contracts at the automated exchange. The matching of orders input in such a system is performed in the central computer server by the unit 13 designed for this task.

Figure 2:
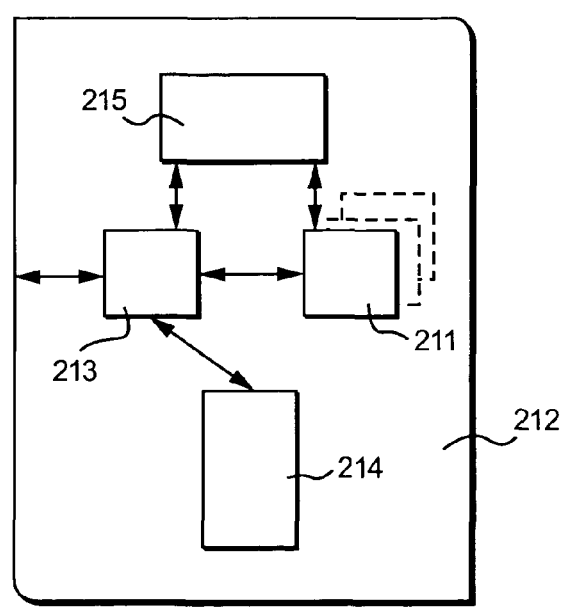
FIG. 2 is a block diagram illustrating parts used in the matching process of the system shown in FIG. 1.

In FIG. 2, a block diagram illustrating different parts of a central computer server 212 having matching unit shown. The matching unit comprises two separate entities 213 and 211. The first entity 213 is a matching unit provided for matching all orders input to the automated exchange system. The unit also matches derived orders as generated by the system as a result of incoming combination orders. Matching unit 213 is associated with an order book 214 and can receive and output information to remote terminals (not shown).

The second entity 211 is a unit for pre-calculating values likely to be used by the matching unit in the matching process. The calculation unit 211 calculates values that are close to the current market values. Other more complex prediction algorithms and models may also be used taking into account price movements, volatility etc. Also more than one unit 211 may be provided.

The values that are calculated by the unit 211 are stored in a global memory 215. The memory 215 is accessible both by the matching unit 213 and by the calculation unit 211. The provision of the global memory comprising values to be used in matching process enables the matching unit to execute the matching fast, since if a value requiring complex calculations is required this value can be fetched directly from the global memory 215. Hence, the matching unit does not need to use any of its own processing power for performing these calculations.

Thus, the matching process of the matching unit can quickly and easily use the values calculated by the calculation unit. If a value is needed in the matching process and the value does not exist in the global memory 215, the calculation unit will generate that value in real time.

In a preferred example embodiment, the process within the calculation unit also calculates new values that are likely to be required by the matching unit when this first query is answered, in order to minimize the number of queries. This is because a query slows down the performance of the matching as compared directly finding the value in the global memory.

The number of values that can be pre-calculated may or may not be configurable. If many values are calculated in advance, the performance will be high, since no or very few additional calculations will be required and passed on as a query to the calculation unit. However, many pre-calculated values will require a large memory. If less pre-calculated values are used, the performance decreases if the volatility in the market is high but the memory usage will be low. Therefore, there is a trade off between the cost for the memory and the performance level. Also, a prediction model tuned for the financial instruments traded at the automated exchange can be used to minimize the number of queries. As stated above, the number of calculation units (partitions) provided for pre-calculations of values may be more than one in order to even further speed up the execution.

Figure 3:
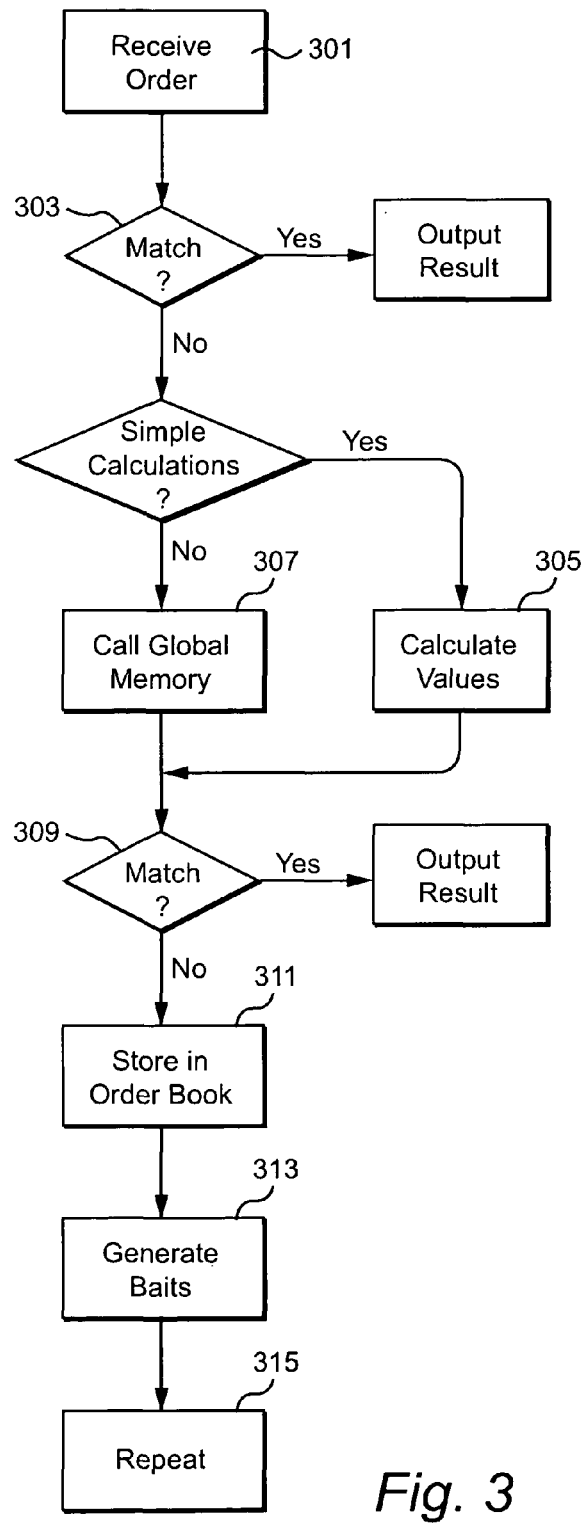
FIG. 3 is a flow chart illustrating process steps carried out when matching combination orders.

In FIG. 3, a flowchart illustrating different steps carried out in the matching unit as described above in conjunction with FIG. 2 is shown. The matching unit matches incoming orders as well as derived baits. Thus, first, in a step 301, a combination order is received by the matching unit 213. The unit then tries to match the order with a corresponding combination order at the same price and volume, step 303.

If the incoming order cannot be matched with another combination order the incoming order the matching unit tries to match the combination order with single orders in the outright market. For the incoming combination order to be matched with outright orders the outright prices and/or the volumes for the combination order must to be calculated.

If the corresponding price and/or volume is given such that their values easily can be calculated the matching unit 213 may calculated them, step 305. If, on the other hand, the corresponding price and/or volume is given by a formula or is for some other reason determined to place a too high load on the processor associated with the matching unit, the matching unit 213 fetches the values needed for the price and/or volume calculation from the global memory 215, step 307. Using the values calculated/fetched in steps 305 and/or 307 the matching unit 213 tries to match the separate legs of the combination order with corresponding orders in the outright market, step 309.

If the incoming combination order cannot be matched in either step 303 or 309, the order is placed in the order book of the automated exchange, step 311. When placed in the order book the matching unit 213 will try to create baits/derived orders from the outright order in the legs in the combination, step 313.

The values used by the matching unit 213 may vary depending on what instruments that are to be traded. For example, when bonds are to be traded price-to-yield calculations are done by the calculation unit 211 for fast access by the matching unit 213 to calculate the prices of the outright legs. The matching unit also needs the duration of the legs for the calculation of the volumes of the legs. Thus, in this example, both the price-to-yield, yield-to-price and duration calculations will be done in the calculation unit 213. All these calculations are very computer intensive and thus can not be performed by the matching unit 211 without rendering a bad performance for the automated exchange. In the example of a covered option trade the matching unit 213 needs the delta values of the outright legs to calculate the volumes but no calculations need to be done for the price determination. Thus the values needed by the calculation unit 213 may differ depending on the instruments traded.

When there are combination orders placed in the order book and derived orders are calculated and placed in the order book, the matching procedure has to be run again whenever a price in the outright instruments are changed or a new order is entered in the outright market, step 315. The procedure will be similar to the one described above in steps 301-313, when an incoming combination is executed.

Figure 4:
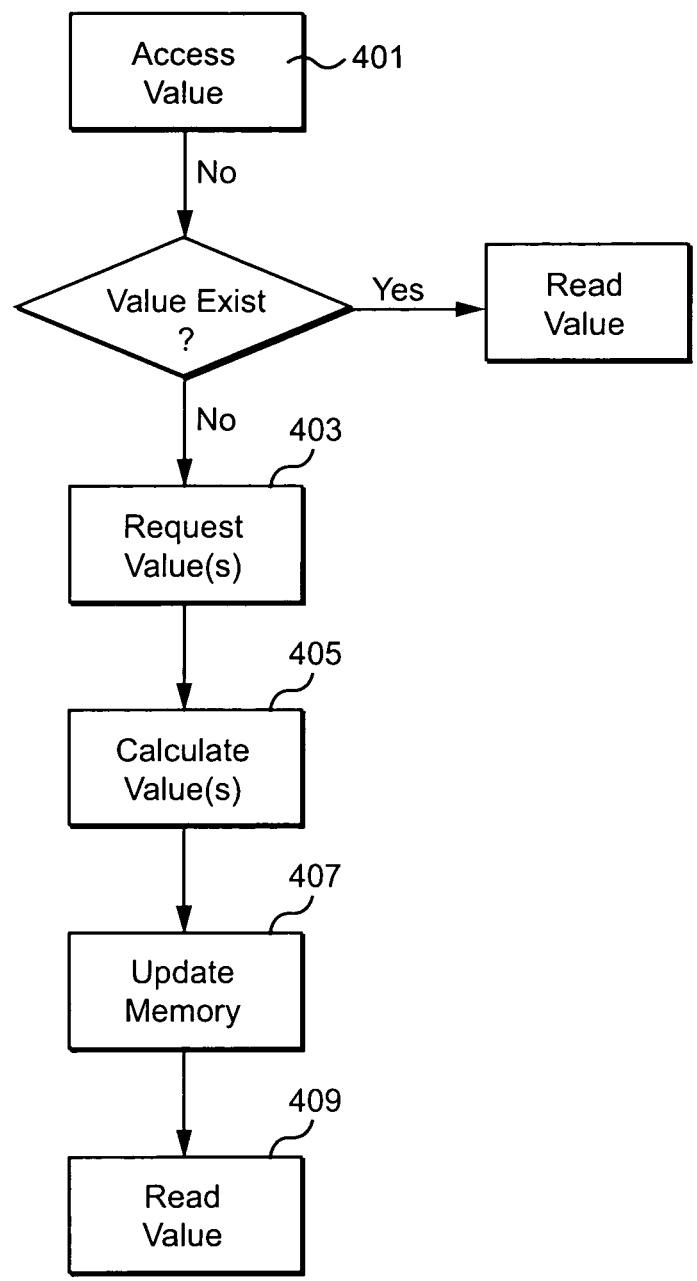
FIG. 4 is a flow chart illustrating further steps carried out in a matching unit.

In either case if a new order is entered far away from the last or the market price existing in the market the values requested by matching unit 213 from the memory 215 may not exist in the memory 215. This is described below with reference to FIG. 4.

In such a case, first the unit 213 tries to access a value in the memory 215, step 401. If the access fails the unit 213 sends a query to the calculation unit 211 requesting new values, step 403. The calculation unit 211 will then interrupt its current calculations and calculate the value(s) requested by the unit 213, step 405. Next the calculation unit 211 will add and remove values from the global memory 215, step 407. The new values will be based on the current market prices. In this manner, the probability that the matching unit 213 again has to query the calculation unit 211 will be reduced. When the memory is updated the calculation unit 211 notifies the unit 213 which now can read the values from the memory 215, step 409. In another preferred embodiment the requested value is first calculated and returned to the matching unit before the memory is updated.

The calculation unit may preferably continuously receive market data so that it can pre-calculate the most likely values to be used by the matching unit 213. The calculated values may, for example, be all the values a standard deviation (volatility) away from the current market values. The matching unit 213 will use the values received from the global memory 215 or the calculation unit 211 to calculate the price and/or volume for the baits. Thus, the matching unit will likely do some calculations, but the process intensive calculations, such as iterative goal seeking, price-to-yield conversion, Black and Scholes option pricing formula, etc., are performed by the calculation unit 211.

The method and system as described herein make it possible to create combinations where the volume and/or the price is determined according to some formula instead of being fixed ratios as most electronic trading systems are designed to handle today. The system and method can also guarantee that all parts of the combination will be executed since the execution is done in the matching process.

The invention claimed is:

1. An automated exchange for trading financial instruments arranged to receive combination orders to be matched, comprising:
   a first computer entity associated with a first computer processor and configured to match the received combination orders;
   a second computer entity, associated with a second processor configured to, locally at the automated exchange and independently of received combination orders, pre-calculate dynamically non-natural matching data values based on received market data for the financial instruments traded at the automated exchange, of which at least some non-natural matching data values will be required in the matching of a subsequently received combination order requiring a simultaneous trade of multiple sub-contracts for different financial instruments, wherein the pre-calculated non-natural matching data values include a volume and/or prices associated with the sub-contracts in combination orders likely to be received by the automated exchange that relates to one or more derived orders including a covered option, a future basis trade, or a bond switch; and
   a shared memory, operatively connected to the first computer entity and the second computer entity, and configured to store the locally pre-calculated non-natural matching data values that relates to one or more derived orders including a covered option, a future basis trade, or a bond switch;
   wherein the first computer entity is configured to use some of the pre-calculated, non-natural matching data values in subsequent matching of one of the received combination orders.

2. The automated exchange according to claim 1, wherein the first computer entity and the second computer entity are located in the same computer server.

3. The automated exchange according to claim 1, further comprising multiple computer processors for calculating pre-calculated matching data values.

4. The automated exchange according to claim 1, wherein the pre-calculated matching data values to be calculated by the second computer entity are based on a prediction model.

5. A method of matching combination orders in an automated exchange system for trading financial instruments, comprising:
   receiving, via an interface of the automated exchange, combination orders;
   a first computer entity including a first computer processor matching received combination orders;
   a second computer entity including a second processor dynamically pre-calculating, locally at the automated exchange system and independently of received combination orders, non-natural matching data values of which at least some non-natural matching data values will be required in the matching of a subsequently received combination order requiring a simultaneous trade of multiple sub-contracts for different instruments in a second computer processor, wherein the pre-calculated, non-natural matching data values include a volume and/or prices associated with the sub-contracts in combination orders likely to be received by the automated exchange system that relate to one or more derived orders including a covered option, a future basis trade, or a bond switch;
   locally storing the pre-calculated, non-natural matching data values that relate to one or more derived orders including a covered option, a future basis trade, or a bond switch in a shared memory operatively connected to the first computer entity and the second computer processor entity; and
   the first computer entity using some of the pre-calculated, non-natural matching data values in subsequent matching of one of the received combination orders.

6. A method according to claim 5, wherein the matching and pre-calculations are performed within different partitions in the same computer server.

7. A method according to claim 5, wherein the pre-calculated matching data values are determined based on a prediction model.

8. A computer program product including program instructions stored on a non-transitory storage medium, which when executed on one or more computer entities, performs a method of matching combination orders in a matching unit of an automated exchange system for trading financial instruments, comprising the steps of:
   receiving, via an interface of the automated exchange, combination orders input to the automated exchange system;
   a first computer entity within the matching unit and including a first computer processor matching received combination orders;
   a second computer entity within the matching unit and including a second processor dynamically pre-calculating, locally at the automated exchange system and independently of received combination orders, non-natural matching data values of which at least some non-natural matching data values will be required in the matching of a subsequently received combination order requiring a simultaneous trade of multiple sub-contracts for different instruments in a second computer processor, wherein the pre-calculated, non-natural matching data values include are related to a volume and/or prices associated with the sub-contracts in the combination order orders likely to be received by the automated exchange system that relate to one or more derived orders including a covered option, a future basis trade, or a bond switch;
   locally storing the pre-calculated, non-natural matching data values that relate to one or more derived orders including a covered option, a future basis trade, or a bond switch calculated by the second computer entity in a shared memory operatively connected to the first computer entity and the second computer processor entity; and
   the first computer entity using some of the pre-calculated, non-natural matching data values in subsequent matching of the one of the received combination orders.

9. The automated exchange in claim 1, wherein the pre-calculated, non-natural data values are related to a volume and/or prices associated with baits derived from the received combination orders.

10. The automated exchange in claim 1, wherein the second computer entity is configured to pre-calculate the non-natural data values using one or more of the following: an iterative goal seeking formula, a price-to-yield formula, a yield-to-price formula, a contract duration formula, or a Black and Scholes option pricing formula.

11. The method in claim 5, wherein the pre-calculated, non-natural data values are related to a volume and/or prices associated with baits derived from the combination order.

12. The method in claim 5, wherein the pre-calculated, non-natural data values are pre-calculated using one or more of the following: an iterative goal seeking formula, a price-to-yield formula, a yield-to-price formula, a contract duration formula, or a Black and Scholes option pricing formula.

* * * * *